US011904350B2

(12) United States Patent
Lehr

(10) Patent No.: US 11,904,350 B2
(45) **Date of Patent: *Feb. 20, 2024**

(54) TEXTURIZING A WALL OR CEILING WITH NON-ACOUSTICAL JOINT COMPOUND

(71) Applicant: EZ-PRO TEXTURE INC., Corona, CA (US)

(72) Inventor: Steven Robert Lehr, Lake Elsinore, CA (US)

(73) Assignee: EZ-PRO TEXTURE INC., Corona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,152

(22) Filed: Feb. 23, 2023

(65) Prior Publication Data

US 2023/0191446 A1 Jun. 22, 2023

Related U.S. Application Data

(63) Continuation of application No. 17/204,886, filed on Mar. 17, 2021, now Pat. No. 11,612,909, which is a continuation of application No. 16/439,533, filed on Jun. 12, 2019, now Pat. No. 10,981,192, which is a continuation of application No. 16/037,252, filed on (Continued)

(51) Int. Cl.

| | |
|---|---|
| ***B05D 1/02*** | (2006.01) |
| ***B65D 35/12*** | (2006.01) |
| ***B05B 7/24*** | (2006.01) |
| ***E04F 21/06*** | (2006.01) |
| ***E04F 21/12*** | (2006.01) |
| ***E04F 21/16*** | (2006.01) |

(52) U.S. Cl.
CPC .............. *B05D 1/02* (2013.01); *B05B 7/2424* (2013.01); *B05B 7/2481* (2013.01); *B05B 7/2483* (2013.01); *B05B 7/2489* (2013.01); *B65D 35/12* (2013.01); *E04F 21/06* (2013.01); *E04F 21/12* (2013.01); *E04F 21/16* (2013.01)

(58) Field of Classification Search
CPC ....... B05D 1/02; B05B 7/2424; B05B 7/2481; B05B 7/2483; B05B 7/2489; B65D 35/12; E04F 21/06; E04F 21/12; E04F 21/16
USPC ... 239/8, 152, 327, 328, 340, 354, 346, 369, 239/373, 379, 586; 222/92, 107, 206, 222/215, 630, 633, 637; 406/38, 146
See application file for complete search history.

(56) References Cited

U.S. PATENT DOCUMENTS 3,052,417 A 9/1962 Daniel
3,201,047 A 8/1965 Danberg
(Continued)

*Primary Examiner* — Steven J Ganey
(74) *Attorney, Agent, or Firm* — KOS IP Law LLP

(57) ABSTRACT

A method of texturing a wall or ceiling with non-acoustical joint compound by providing a collapsible bag having an opening at its top and is adapted to contain non-acoustical joint compound for forming a textured coating on the wall or ceiling and providing a spray nozzle having a low pressure input port, a joint compound suction port attached to the opening at the top of the collapsible bag, and an output port for spraying the non-acoustical joint compound. A low pressure stream of air from an air gun attached to the low pressure input port urges a small quantity of the non-acoustical joint compound to be sprayed out of the spray nozzle when the bottom of the collapsible disposable bag is raised above its top to either allow or force the joint compound to flow into the suction port and into the interior of the spray nozzle.

15 Claims, 3 Drawing Sheets

Related U.S. Application Data

Jul. 17, 2018, now Pat. No. 10,357,800, which is a continuation of application No. 15/688,709, filed on Aug. 28, 2017, now Pat. No. 10,046,357, which is a continuation of application No. 15/399,682, filed on Jan. 5, 2017, now Pat. No. 9,776,205, which is a continuation of application No. 14/858,205, filed on Sep. 18, 2015, now Pat. No. 9,562,364, which is a continuation of application No. 14/462,135, filed on Aug. 18, 2014, now Pat. No. 9,163,416, which is a continuation of application No. 12/765,860, filed on Apr. 22, 2010, now Pat. No. 8,840,038.

(56) References Cited

U.S. PATENT DOCUMENTS

| | | | | | |
|---|---|---|---|---|---|
| 3,236,459 | A | | 2/1966 | Mcritchie | |
| 4,123,005 | A | | 10/1978 | Blunk | |
| 4,434,939 | A | * | 3/1984 | Stankowitz | B05B 7/2435 239/345 |
| 4,776,488 | A | | 10/1988 | Gurzan | |
| 4,863,104 | A | | 9/1989 | Masterson | |
| 4,936,511 | A | | 6/1990 | Johnson | |
| 4,948,054 | A | | 8/1990 | Mills | |
| 5,039,017 | A | | 8/1991 | Howe | |
| 5,713,519 | A | | 2/1998 | Sandison | |
| 5,979,797 | A | | 11/1999 | Castellano | |
| 6,095,435 | A | | 8/2000 | Greer, Jr. | |
| 7,156,324 | B2 | | 1/2007 | Birrenkott | |
| 7,617,995 | B2 | | 11/2009 | Florio | |
| 7,861,950 | B2 | | 1/2011 | Rossner | |
| 8,840,038 | B2 | | 9/2014 | Lehr | |
| 9,163,416 | B2 | | 10/2015 | Lehr | |
| 9,562,364 | B1 | | 2/2017 | Lehr | |
| 9,776,205 | B1 | | 10/2017 | Lehr | |
| 10,046,357 | B1 | | 8/2018 | Lehr | |
| 10,357,800 | B1 | | 7/2019 | Lehr | |
| 10,981,192 | B2 | | 4/2021 | Lehr | |
| 2006/0065761 | A1 | | 3/2006 | Joseph | |
| 2011/0259970 | A1 | * | 10/2011 | Lehr | E04F 21/06 239/328 |

* cited by examiner

TEXTURIZING A WALL OR CEILING WITH NON-ACOUSTICAL JOINT COMPOUND

The present application is a continuation of which is is a continuation of U.S. patent application Ser. No. 17/204,886, filed 2021 Mar. 17, which is is a continuation of U.S. patent application Ser. No. 16/439,533, filed 2019 Jun. 12, which is a continuation of U.S. patent application Ser. No. 16/037,252, filed 2018 Jul. 17, which is a continuation of U.S. patent application Ser. No. 15/688,709, filed 2017 Aug. 28, which is a continuation of U.S. patent application Ser. No. 15/399,682, filed 2017 Jan. 5, which is a continuation patent application of U.S. patent application Ser. No. 14/858,205, filed 2015 Sep. 18, which a continuation patent application of U.S. patent application Ser. No. 14/462,135, filed on 2014 Aug. 18, which is a continuation patent application of U.S. patent application Ser. No. 12/765,860, filed on 2010 Apr. 22, the entire contents of which are incorporated herein by reference.

BACKGROUND OF THE INVENTION

Field of the Invention

The present invention relates generally to a system and method of applying a textured finish to a wall and/or a ceiling and more specifically where the textured finish is a coating of non-acoustical joint compound which may be mixed with water and applied by spraying the non-acoustical joint compound onto a wall or ceiling with a low pressure air gun to obtain a textured finish.

Description of Related Art

Apparatus for spraying texture material is known in the prior art. More specifically by way of example U.S. Pre-Grant Publication No. 2010/0014908 to Campbell, et al. relates to a joint compound tool including a mixer, a hose, and an applicator. The mixer has a hopper and a beater positioned therein. The beater has a rotatable drive shaft journaled in opposed ends of the hopper. A number of first support rods radiate outwardly from the drive shaft remote from the hopper outlet and a pair of intertwined helical bands encircle and are affixed to the drive shaft by the first support rods. A number of second support rods radiate outwardly from the drive shaft adjacent the hopper outlet and are secured to the second support rods. A motor is connected to the drive shaft for rotating a beater. A pump is connected to the hopper outlet for pressurizing joint compound received from the hopper. A hose connects the pump to a joint compound applicator having a valve assembly for controlling the flow of joint compound received from the hose and a roller assembly for applying joint compound to drywall.

U.S. PreGrant Publication No. 2007/0246570 to Cataline relates to a handheld drywall joint compound and acoustic ceiling texture application device. An embodiment of the invention comprises an expansion bag within a tube. The tube also contains texture material, and as the bag is inflated in the tube, the texture material is forced into a spray device that is connected to the tube. The spray device allows the user to apply the texture material to the desired locations.

U.S. PreGrant Publication No. 2007/0108233 to Grayden relates to a spray texturing system having a reservoir; a cart structure to support the reservoir above the ground; at least one support to hold a spray texture gun and hopper in position adjacent to the reservoir; and a user controlled mechanism to selectively release an amount of spray texture compound from within the reservoir into the hopper.

U.S. PreGrant Publication No. 2004/0112982 to Dilley relates to a pressurized air canister and a drywall mud canister connected to a backpack that a user wears on his back. The user holds a spray gun in his hands. Pressurized air from the pressurized air canister provides pressure to both the spray gun and the drywall mud canister enabling the spray gun to spray the drywall mud.

U.S. Pat. No. 6,695,181 to Kreitzer, et al. relates to a wedge-shaped mud box with a mud outlet orifice in the bottom wall. An edge of the wedge-shaped box has a rectangularly shaped cover that is rotatable between a filling position and an operating position. The cover is biased toward a bottom wall of the box to force mud contained in the box toward the outlet orifice. A mud gun, including a hollow body with an inlet and an outlet orifice, is releasable attached to the outlet orifice of the box. When air under pressure is introduced into an air inlet of the gun, mud entering through the inlet orifice is forced out through the outlet orifice of the gun. A nozzle chassis is affixed to the gun with a plurality of different nozzles movably attached thereto, and each nozzle is movable between a stored and an aligned position so that only one nozzle of the plurality of nozzles is aligned with the outlet orifice of the gun at a time.

U.S. Pat. No. 6,390,801 to Smith relates to a manual tool for imparting a textured surface to a wall or ceiling. The tool has a rigid, flat, thin tool blade with a plurality of holes irregularly distributed thereon. The holes are preferably irregular in shape and have major dimension in the range 0.5 to 1.25 inch. A handle for grasping and manipulating the tool is attached to a first side of the tool blade. A rectangular blade version of the tool is used for texturing corner areas, and a circular blade version of the tool is used for non-corner areas. In use, joint compound is applied to a second, opposite side of the blade and then daubed onto a surface area. The tool is then repeatedly pressed against and withdrawn from the area until a desired surface texture is achieved.

U.S. Pat. No. 6,386,402 to Woods relates to an aqueous quick dry sprayable drywall texture material in the form of a sprayable composition having an aqueous base, a filler and a polymer. The aqueous quick dry sprayable drywall texture is storable and dispensable from a pressurized dispenser having a delivery nozzle or other spray dispensing device. An aerosol system with a spray nozzle is included on the container for selective discharge of the textured material onto a prepared patch area or other substrate so as to match and blend with the surrounding drywall area to provide a continuous and unbroken coextensive surface texture of mechanically and visually matched material.

U.S. Pat. No. 5,713,519 to Sandison, et al. relates to spraying single or multiple fluids onto a surface. The spray applicator utilizes a venturi effect to independently draw fluids from separate containers, atomize the fluids and spray the fluids in a desired pattern onto a surface. The atomized streams generally overlap so that the fluids mix prior to contacting the target surface. In one embodiment, the fluids are retained in flexible containers separately connected to a spray applicator by flexible tubes. The flexible containers include a fitting for receiving a fluid draw tube and a releasable closure for expelling excess pressure within the container.

U.S. Pat. No. 5,401,231 to Hebert relates to a texturing roller for applying drywall mud or plaster to a flat surface such as a wall or ceiling in a texturing pattern, which roller includes a roller cylinder fitted with random holes and multiple leather discs crowded onto the roller cylinder by rivets which extend through the discs and the holes and are expanded in place by a riveting tool. The roller cylinder is designed to mount on a conventional roller frame and handle normally fitted with a disposable paint cylinder used for painting flat or textured surfaces.

U.S. Pat. No. 5,188,263 to Woods relates to a pressurized dispenser having a container housing a quantity of drywall texture material mixed with a binder and a carrier such as aerosol. A manual pump or spray nozzle is included on the container for selective discharge of the drywall texture material onto a prepared patch which is a drywall sheet so as to match and blend in with the surrounding surface area.

U.S. Pat. No. 4,936,511 to Johnson, et al. relates to a liquid spray gun having a reusable air gun portion with a manually operable valve for controlling air flow; and a disposable container and spray nozzle assembly including a sheet of flexible material having portions attached together and to a central portion of a tube to form a container. A liquid in the chamber, and a spirating nozzle connected to the tube is adapted to be releasably coupled to the air gun portion so that upon movement of air through the nozzle, liquid in the chamber will be entrained in that air and sprayed from the nozzle. The assembly can include a coil comprising a strip disposed in a plurality of wraps about an axis and having a spring temper biasing the strip to an axially extended position to form a tube-like structure, with an end portion of the coil positioned around an end portion of the tube within the bag so that during spraying the tube-like structure will insure that most of the liquid can be dispensed from the chamber.

U.S. Pat. No. 4,123,005 to Blunk relates to a squeeze-type container device for dispensing viscous acoustical texture material by a spraying action on a wall or ceiling surface. A spray head is attached to the container and connected with a source of air under pressure for spraying the viscous material through an orifice for repairing damaged areas of acoustic texture walls or ceilings.

SUMMARY OF THE INVENTION

In an exemplary embodiment of the present invention, there is disclosed a system for texturing a wall or a ceiling with non-acoustical joint compound comprising:

- a collapsible bag having an opening at its top which is adapted to contain non-acoustical joint compound that is to form a textured coating on the wall or ceiling;
- a spray nozzle having a low pressure input port, a joint compound suction port attached to the opening at the top of the collapsible bag, and an output port for spraying the non-acoustical joint compound; and
- an air gun attached to the low pressure input port to spray a small quantity of the non-acoustical joint compound out of the spray nozzle by a low pressure stream of air;
- wherein the bottom of the collapsible disposable bag is raised above its top to either allow or force the non-acoustical joint compound to flow into the suction port and into the interior of the spray nozzle.

In another embodiment there is disclosed a method of texturing a wall or ceiling with non-acoustical joint compound comprises:

- providing a collapsible bag having an opening at its top and is adapted to contain non-acoustical joint compound for forming a textured coating on the wall or ceiling;
- providing a spray nozzle having a low pressure input port, a joint compound suction port attached to the opening at the top of the collapsible bag, and an output port for spraying the non-acoustical joint compound; and
- attaching an air gun to the low pressure input port wherein the air gun urges a small quantity of the non-acoustical joint compound to be sprayed out of the spray nozzle by a low pressure stream of air;
- wherein the bottom of the collapsible disposable bag is raised above its top to either allow or force the joint compound to flow into the suction port and into the interior of the spray nozzle.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

This invention relates to using a low pressure air gun to spray a ceiling or wall with a coating of joint compound to obtain a textured finish Joint compound normally is purchased in a ready to use five gallon plastic bucket. It has a spreadable consistency, however, if the joint compound is too thick, a small amount of water can be mixed in until a desired consistency is obtained. If, prior to being used, the joint compound starts to thicken or dry, the addition of water can help it to bring it back to the consistency desired.

The texture material may be applied to an entire surface such as a wall or a ceiling or it may be applied to small areas on a wall or ceiling. The coating, when dry, will have a distinctive surface texture. By varying the consistency of the joint compound that is sprayed onto the surface such as the amount of water that is added to the joint compound, the texture of the surface can be varied to provide different textures. Depending on the air pressure that is fed to the gun, the spray pattern that is obtained with the venture type spray nozzle and the consistency or thickness of the joint compound, the texture pattern obtained may be varied to obtain a variety of textured finishes such as for example, a fine texture; a medium splatter texture, a heavy splatter texture, etc.

Figure 1:
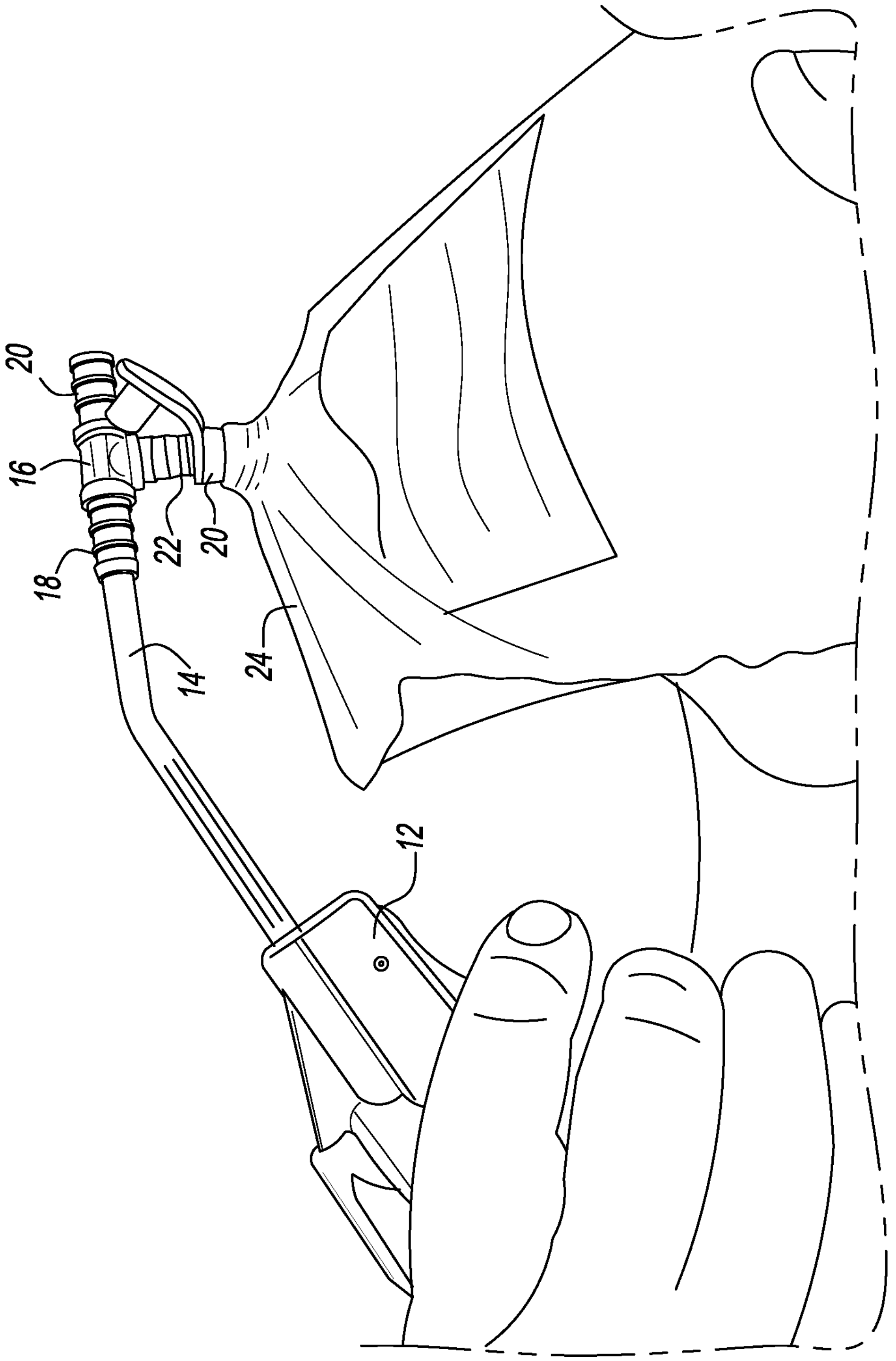
FIG. 1 is a side view of a low pressure air gun attached to a joint compound supply bag prior to spraying a wall or ceiling with a texture coating of non-acoustical joint compound in accordance with the principles of the invention.

Referring to FIG. 1, there is shown a side view of a low pressure air gun attached to a joint compound supply bag prior to spraying a wall or ceiling with joint compound to obtain a desired texture finish. The air gun 12 is connected to a portable air compressor (not shown) which can be set to provide a supply of air at a preset pressure of between 80 psi and 140 psi above atmospheric pressure. The air gun has a trigger which controls the supply of air fed to the tip 14 of the air gun. A venture type spray nozzle 16 having a low air pressure input port 18, a joint compound spray output port 20 and a joint compound suction port 22 is located between the air gun 12 and a joint compound supply bag 24. The joint compound suction port 22 of the venture type spray nozzle is press fit into a cylindrical neck top member 26 which can be made of a polastic on a joint compound supply bag 28.

In this embodiment the suction port of the venture type spray nozzle is not connected to a joint compound supply feed tube. The joint compound is fed to the suction port of the venture type spray nozzle by either squeezing the collapsible bag 24 to move the non-acoustical joint compound in the bag up to and into the suction port 22 of the venture type spray nozzle or by raising the bottom of the bag relative to the top of the bag so that the non-acoustical joint compound in the bag flows down to the top of the bag and into the suction port 22 of the venture type spray nozzle.

Figure 2:
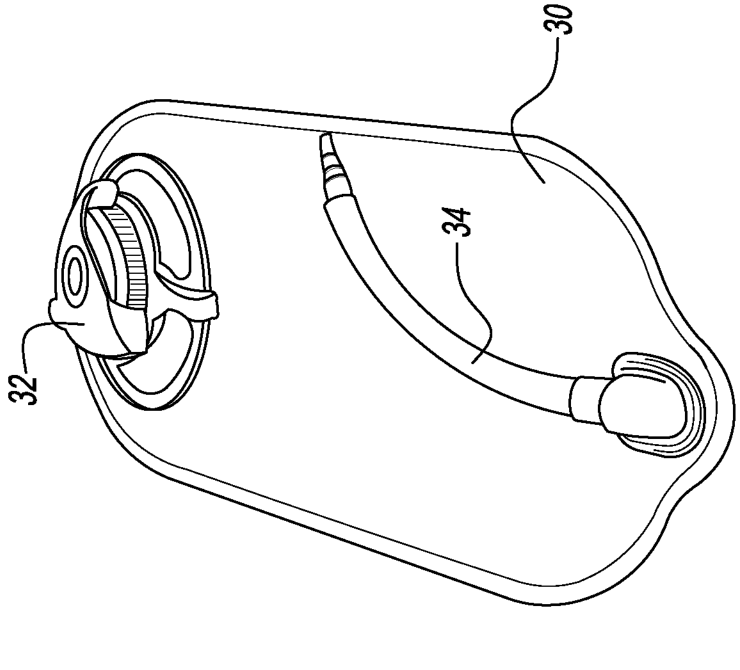
FIG. 2 is a perspective view of a collapsible holding bag used to fill the supply bag with non-acoustical joint compound in accordance with the principles of the invention.

Referring to FIG. 2, there is shown a perspective view of a collapsible holding bag which can be used to mix non-acoustical joint compound with water and is then used to fill a supply bag with the non-acoustical joint compound. Bag 30 has a relatively wide opening 32 at one end which can be sealed with a twist on top and is used to place non-acoustical joint compound into the bag. A loop is attached to the bag at its top to allow the bag to be placed on a hook. Located at the bottom of the bag is a tube 34 for transferring non-acoustical joint compound from holding bag 30 to a supply bag 24.

The non-acoustical joint compound is normally purchased from a building supply store and has a consistency of whipped cream. If desired, the consistency of the joint compound can be modified by mixing a selected amount of non-acoustical joint compound located in holding bag 30 with a small amount of water. In some applications the amount of water used is such that the consistency of the non-acoustical joint compound is slightly more fluid than the consistency of the purchased non-acoustical joint compound. The final consistency of the joint compound should be such that it can be moved into the suction port of the venture type spray nozzle and be sprayed out of the output port at a steady uniform flow.

Figure 3:
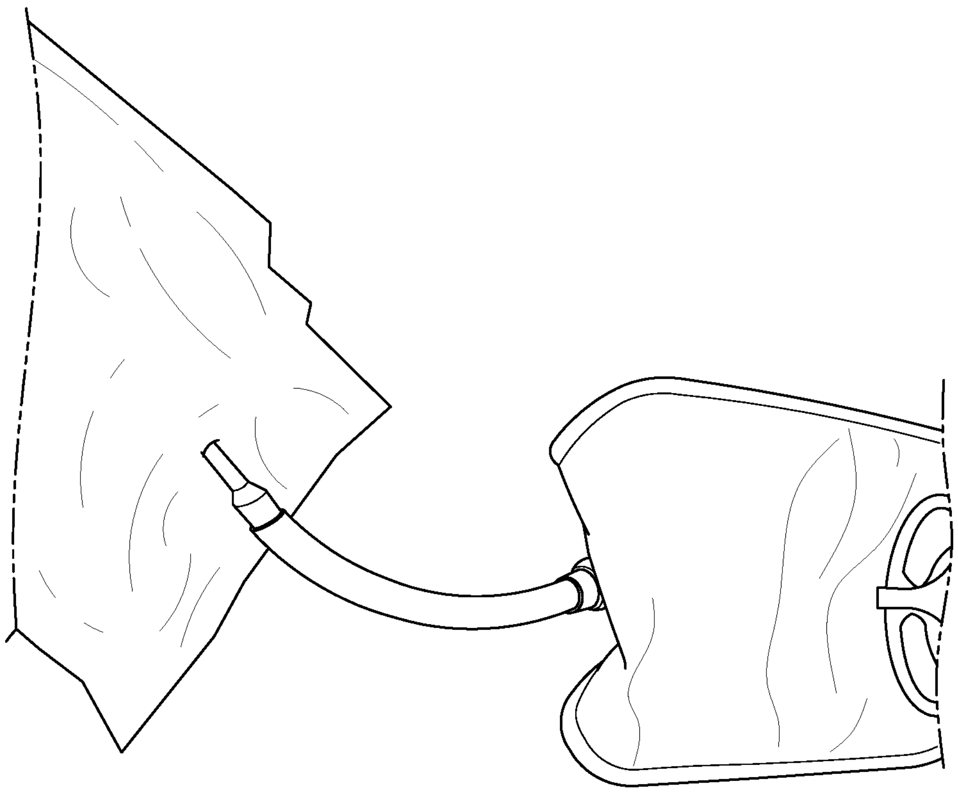
FIG. 3 is a view of the holding bag connected to fill a supply bag with non-acoustical joint compound.

Referring to FIG. 3, there is shown is a view of the holding bag being connected to and filling a supply bag with joint compound. The supply bags are collapsible disposable items which, after being used, are discarded. They are not cleaned or reused. In another embodiment of the invention, a user of this invention will purchase supply bags which are filled with non-acoustical joint compound having a specific consistency and which are either white, off white or have a color of choice where color pigment is added to the non-acoustical joint compound in the supply bag the way that color pigment is added to a can of white paint to obtain a desired color.

By adding color to the joint compound before it is sprayed onto a wall or ceiling, painting of the textured wall or ceiling is virtually eliminated.

Figure 4:
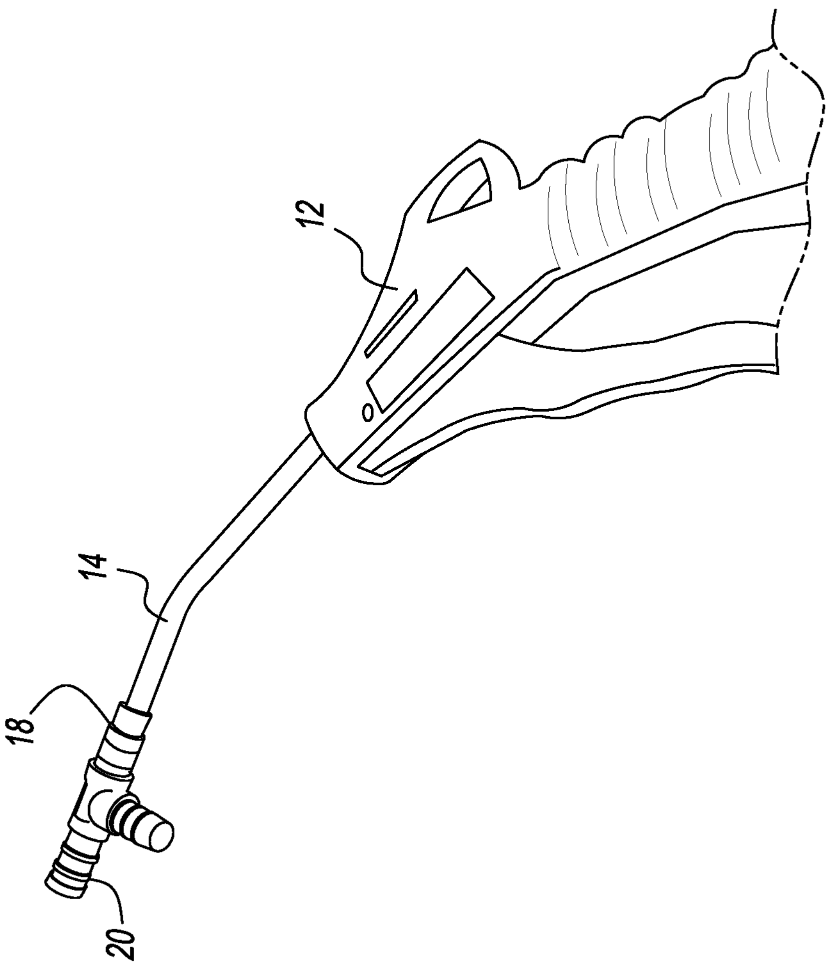
FIG. 4 is a perspective view of the low pressure air gun attached to a venture type spray nozzle prior to being attached to a supply bag having non-acoustical joint compound in accordance with the principles of the invention.

Referring to FIG. 4, there is shown a perspective view of the low pressure air gun 12 attached to the venture type spray nozzle 16 prior to being attached to a supply bag filled with non-acoustical joint compound which is either white or has been mixed with one or more pigments to have a desired color.

In operation the joint compound suction port of the venture type spray gun is press fit into the cylindrical shaped neck member 26 on a joint compound supply bag 28 that is filled with non-acoustical joint compound of a desired color and the tip 14 of the low pressure air gun is inserted into the low pressure input port 18 of the venture type spray gun. At this time the air gun is attached via an air hose to a portable air compressor which is operating to supply low pressure air to the air gun. The user now holds the air gun in one hand and, while holding the supply bag with the other hand, either squeezes the supply bag or raises the bottom of the supply bag to be above the suction port of the venture type spray nozzle to either allow or force the non-acoustical joint compound to flow into the suction port and into the interior of the spray nozzle.

At this time the user squeezes the trigger of the air gun while pointing the output port of the spray nozzle at a wall or a ceiling to direct a small quantity of non-acoustical joint compound which is sprayed out of the spray nozzle by the low pressure stream of air toward the wall or ceiling. Through trail and error, the user quickly learns how to regulate the amount of joint compound that is fed to the suction port of the spray nozzle.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A system for texturing a surface, the system comprising:

a drywall texturing material;

a drywall texturing mated al container having an opening and containing the drywall texturing material that forms a textured coating on the surface;

a sprayer having an input port and an output port, the sprayer being attachable to the drywall texturing material container, the input port being in fluid communication with the drywall texturing material container when the sprayer is attached to the drywall texturing material container to introduce the drywall texturing material into the input port via pressure associated with the drywall texturing material container and the output port for spraying the drywall texturing material on the surface out of the output port via pressure associated with the drywall texturing material container;

wherein the drywall texturing material container is disposed below the input port and pressure applied to the drywall texturing material container to forcefully lift the drywall texturing material into the input port of the sprayer and into the sprayer.

2. The system of claim 1 wherein the opening of the collapsible bag is a cylindrical neck.

3. The system of claim 2 wherein the cylindrical neck is made of plastic.

4. The system of claim 2 wherein the sprayer is adapted to be connected to a, source of air having a pressure greater than atmospheric pressure.

5. The system of claim 1 wherein the drywall texturing material is a joint compound.

6. The system of claim 5 wherein the joint compound is a non acoustical joint compound.

7. The system of claim 1 wherein a consistency of the drywall texturing material is sufficient to allow the drywall texturing material to be moved into the input port of a spray nozzle and be sprayed out of the output port via pressure associated with the drywall texturing material container.

8. The system of claim 1 wherein the sprayer further comprises a trigger for selectively allowing a stream of air through the sprayer.

9. A method of texturing a surface with a drywall texturing material, the method comprising the steps of:

providing the drywall texturing material container having an opening and containing the drywall texturing material which forms a textured coating on the surface, wherein the drywall texturing material container is a collapsible bag;

providing a sprayer having an input port and an output port, the sprayer being attachable to the drywall texturing material container, the input port being in fluid communication with the drywall texturing material container when the sprayer is attached to the drywall texturing material container, the output port sprays the drywall texturing material via pressure associated with the drywall texturing material container;

attaching the drywall texturing material container underneath the sprayer which establishes fluid communication between the input port and the drywall texturing material container to provide a pathway for the drywall texturing material to be delivered to the output port of the sprayer;

forcing the drywall texturing material into the input port via pressure associated with the drywall texturing material container so that the drywall texturing material is sprayed onto the surface.

10. The method of claim 9 wherein the opening of the collapsible bag is a cylindrical neck.

11. The method of claim 10 wherein the cylindrical neck is made of plastic.

12. The method of claim 10 wherein the sprayer is adapted to be connected to a source of air having a pressure greater than atmospheric pressure.

13. The method of claim 9 wherein the drywall texturing material is a joint compound.

14. The method of claim 9 wherein a consistency of the drywall texturing material is sufficient to allow the drywall texturing material to be moved into the input port of a spray nozzle and be sprayed out of the output port via pressure associated with the drywall texturing material container.

15. The method of claim 9 wherein the collapsible bag is initially squeezed to force the drywall texturing material into a stream of air after flowing through the sprayer.

* * * * *